United States Patent
Ozue et al.

(10) Patent No.: US 6,356,403 B2
(45) Date of Patent: *Mar. 12, 2002

(54) ROTARY MAGNETIC HEAD APPARATUS HAVING REPRODUCTION SIGNAL WIRING, POWER-SUPPLY WIRING AND RECORDING SIGNAL WIRING SECTIONS IN A ROTOR AND A STATOR ARRANGED IN A PREDETERMINED MANNER

(75) Inventors: Tadashi Ozue; Toshio Shirai, both of Kanagawa; Tomohiro Ikegami, Chiba, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,323

(22) Filed: Apr. 20, 1998

(30) Foreign Application Priority Data

Apr. 25, 1997 (JP) .............................................. 9-109507

(51) Int. Cl.[7] ........................... G11B 15/14; G11B 15/12
(52) U.S. Cl. ........................................... 360/64; 360/62
(58) Field of Search ............................. 360/61, 62, 64, 360/108, 130.22, 130.24

(56) References Cited

U.S. PATENT DOCUMENTS

| | | | | |
|---|---|---|---|---|
| 4,455,584 A | * | 6/1984 | Heitmann | 360/39 |
| 4,605,974 A | * | 8/1986 | Ochi et al. | 360/62 |
| 4,825,307 A | * | 4/1989 | Otokawa | 360/60 |
| 5,249,087 A | * | 9/1993 | Berkheimer | 360/61 |
| 5,369,534 A | * | 11/1994 | Han | 360/64 |
| 5,629,812 A | * | 5/1997 | Kleinhuis | 360/64 |

* cited by examiner

*Primary Examiner*—Regina Y. Neal
(74) *Attorney, Agent, or Firm*—Frommer Lawrence & Haug LLP; William S. Frommer; Dennis M. Smid

(57) ABSTRACT

A rotary magnetic head apparatus is provided which can be formed into a small size even if a plurality of reproduction heads are provided. The rotary magnetic head apparatus includes a rotary drum having a rotor of a transmission apparatus and a plurality of reproduction heads, a fixed drum having a stator of the transmission apparatus and a plurality of reproduction heads, a reproduction signal selection device for selecting a reproduction signal of an information recording medium, which signal is obtained by each of the reproduction heads and for arranging the reproduction signal in sequence, a rotor reproduction signal wiring section which is disposed in the rotor and to which is supplied the reproduction signal of each of the reproduction heads, which reproduction signal is sent from the reproduction signal selection device, and a stator reproduction signal wiring section, which is disposed in the stator, for receiving the reproduction signal from the rotor reproduction signal wiring section without contact.

6 Claims, 14 Drawing Sheets

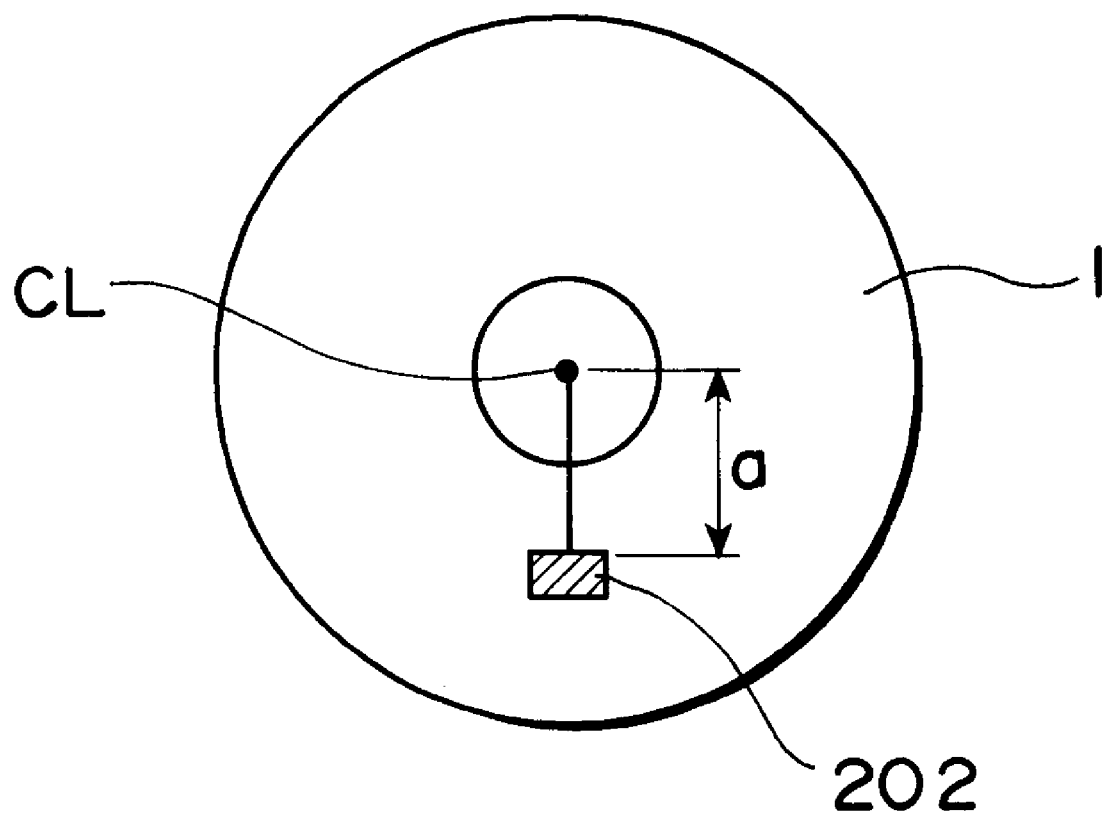

ROTARY MAGNETIC HEAD APPARATUS HAVING REPRODUCTION SIGNAL WIRING, POWER-SUPPLY WIRING AND RECORDING SIGNAL WIRING SECTIONS IN A ROTOR AND A STATOR ARRANGED IN A PREDETERMINED MANNER

BACKGROUND OF THE INVENTION

1. Field of the Invention

The present invention relates to a rotary magnetic head apparatus comprising a non-contact-type transmission apparatus for use in an information writing apparatus, such as a video tape recorder.

2. Description of the Related Art

Apparatuses for recording information onto a magnetic tape and reproducing information of a magnetic tape include video tape recorders, tape streamers, and the like. Such types of information writing apparatus comprise a rotary magnetic head apparatus for the purpose of recording a signal onto a magnetic tape and reproducing a signal of a magnetic tape.

The rotary magnetic head apparatus includes a rotary drum and a fixed drum, and the rotary drum includes a recording head and a reproduction head. The recording head is a head for recording a signal onto a magnetic tape, and the reproduction head is used to reproduce a signal recorded on a magnetic tape.

The rotary drum, which houses the recording head and the reproduction head, is rotated by the actuation of a motor with respect to the fixed drum, causing the recording head or the reproduction head to scan the magnetic tape, for example, by a helical scan method. Thus, information can be recorded onto a magnetic tape or information of a magnetic tape can be reproduced along the recording tracks by a tracking reproduction method.

By adopting such a helical scan method, high-density recording of a signal onto a magnetic tape is made possible, and the relative speed between the magnetic tape and the magnetic head can be increased.

In the rotary magnetic head apparatus of a helical scan method, since the recording head and the reproduction head are housed inside the rotary drum, signals and power must be exchanged between this rotary drum and a fixed drum by a non-contact method; for example, in the case when a reproduction signal obtained from the reproduction head is transmitted from the rotary drum to the fixed drum in a non-contact manner, or when power for a circuit substrate is supplied from the fixed drum to the rotary drum.

In this type of rotary magnetic head apparatus used in the conventional art, non-contact-type transmission of a signal system uses a rotary transformer dedicated to the signal system, and in order to supply power without contact, another rotary transformer for power supply is required. The reason why a rotary transformer of a signal system and another rotary transformer for power supply are prepared in this manner is to prevent crosstalk of a transmission signal used for the rotary transformer for power supply to the rotary transformer side of the signal system.

This crosstalk refers to leakage of a signal due to a leakage magnetic-field between the adjacent signal system and power-supply system or between different signal systems.

However, the rotary magnetic head apparatus comprising two rotary transformers is enlarged, the cost increases, and in addition it is difficult to mount two rotary transformers to a small rotary magnetic head apparatus.

Also, in the rotary transformer, often, one transmission channel of the rotary transformer is assigned to a respective reproduction heads and a reproduction signal system thereof. However, while there has been a demand for an increase in the amount of recording data and a higher transfer rate, it is expected that the number of reproduction heads mounted in a rotary drum and the number of channels of the reproduction signal system will be greater in the future. In the current situation where one transmission channel of the rotary transformer is assigned to one reproduction head and one reproduction signal system, the rotary transformer is enlarged, causing the rotary drum to is enlarged. Therefore, it is difficult to mount such a rotary magnetic head apparatus including a plurality of reproduction heads and reproduction head signal systems to a small information apparatus, and greater costs are incurred.

SUMMARY OF THE INVENTION

Accordingly, an object of the present invention, the achievement of which solves the above-described problems, is to provide a rotary magnetic head apparatus which can be formed into a small size even if a plurality of reproduction heads are provided.

To achieve the above-described object, according to the present invention, there is provided a rotary magnetic head apparatus which records a signal onto a tape-like information recording medium and reproduces a signal of a tape-like information recording medium, said rotary magnetic head apparatus comprising: a transmission apparatus for transmitting power and signals in a non-contact manner between a rotor and a stator; a rotary drum having a rotor of a transmission apparatus and a recording head; a fixed drum having a stator of a transmission apparatus and a plurality of reproduction heads; reproduction signal selection means for selecting a reproduction signal of the information recording medium obtained by each reproduction head and for arranging the reproduction signal in sequence; a rotor reproduction signal wiring section which is disposed in the rotor and to which is input a reproduction signal of each reproduction head, which reproduction signal is sent from the reproduction signal selection means; and a stator reproduction signal wiring section, which is disposed in the stator, for receiving a reproduction signal without contact from the rotor reproduction signal wiring section.

In the present invention, the rotary drum of the rotary magnetic head apparatus includes a rotor of a transmission apparatus and a recording head. The fixed drum of the rotary magnetic head apparatus includes a stator of the transmission apparatus and a plurality of reproduction heads. The reproduction signal selection means is capable of selecting a reproduction signal of an information recording medium, which reproduction signal is obtained by each reproduction head. Supplied to the rotor reproduction signal wiring section is a reproduction signal of each reproduction head, which signal is sent from the reproduction signal selection means. The stator reproduction signal wiring section is designed to receive the reproduction signal from each rotor reproduction signal wiring section without contact.

As a result of the above, since the reproduction signal obtained by a plurality of reproduction heads is selected and arranged in sequence by the reproduction signal selection means, it is not necessary to provide rotor reproduction signal wiring sections and stator reproduction signal wiring sections corresponding to the number of reproduction heads. That is, since the reproduction signal transmission system for a reproduction signal from each reproduction head, which reproduction signal is arranged by the reproduction signal selection means, needs to be prepared, for example, for one channel, it is possible to decrease the number of channels of the rotor reproduction signal wiring section and the stator reproduction signal wiring section for the purpose of transmission without contact.

The above and further objects, aspects and novel features of the invention will become more apparent from the following detailed description when read in connection with the accompanying drawings.

BRIEF DESCRIPTION OF THE DRAWINGS

FIG. 13 shows an example of the arrangement of the magnet of the fixed drum, and an example of the relationship between a delay time d and an angle θ.

DESCRIPTION OF THE PREFERRED EMBODIMENTS

The preferred embodiments of the present invention will be described below in detail with reference to the accompanying drawings.

Since the embodiments to be described below are preferred specific examples of the present invention, various technically preferred limitations are imposed. However, the present invention is not limited to these embodiments unless a description limiting the present invention is given in the following description.

Figure 1:
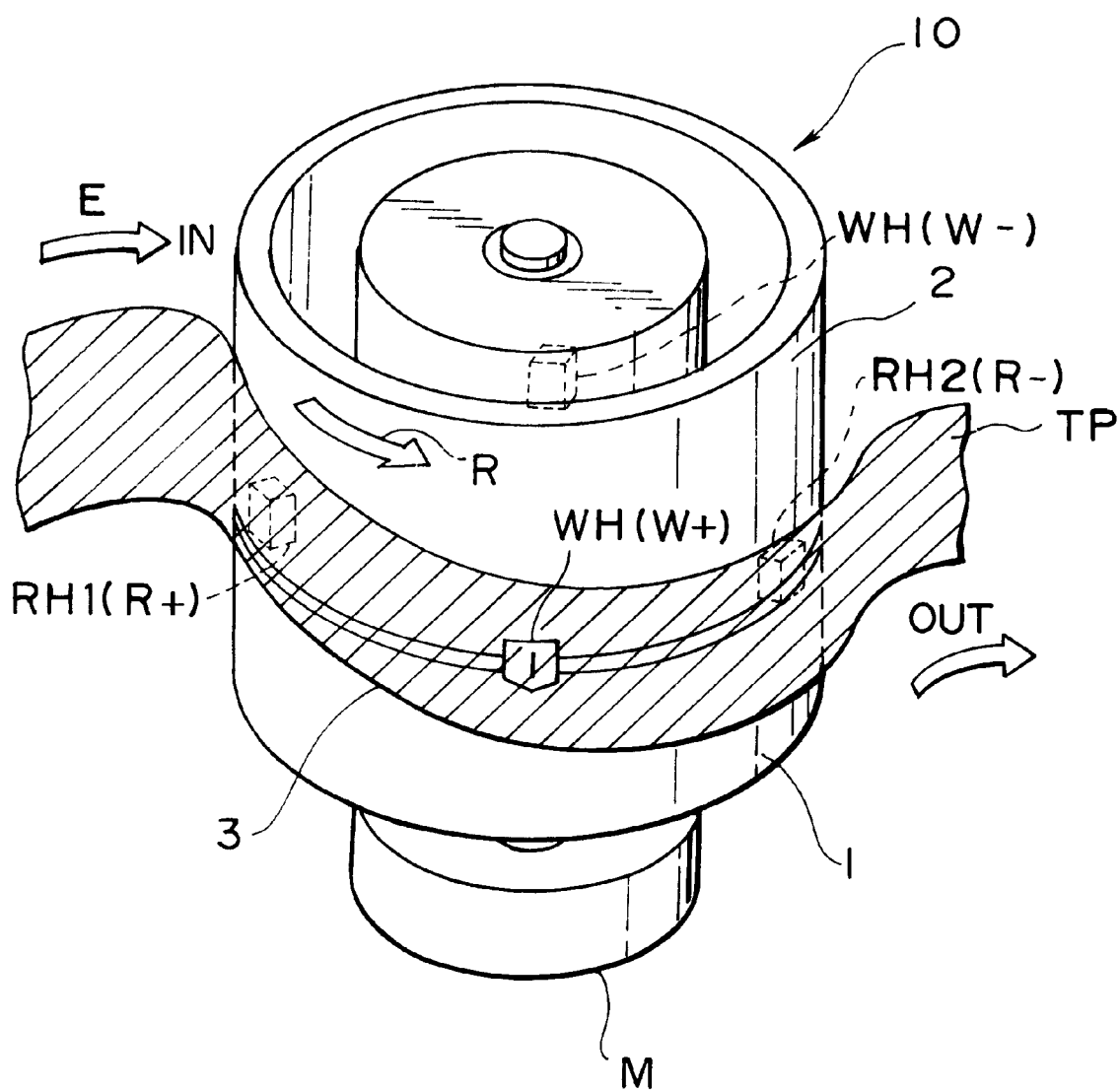
FIG. 1 is a perspective view showing a rotary magnetic head apparatus of the present invention.
Figure 2:
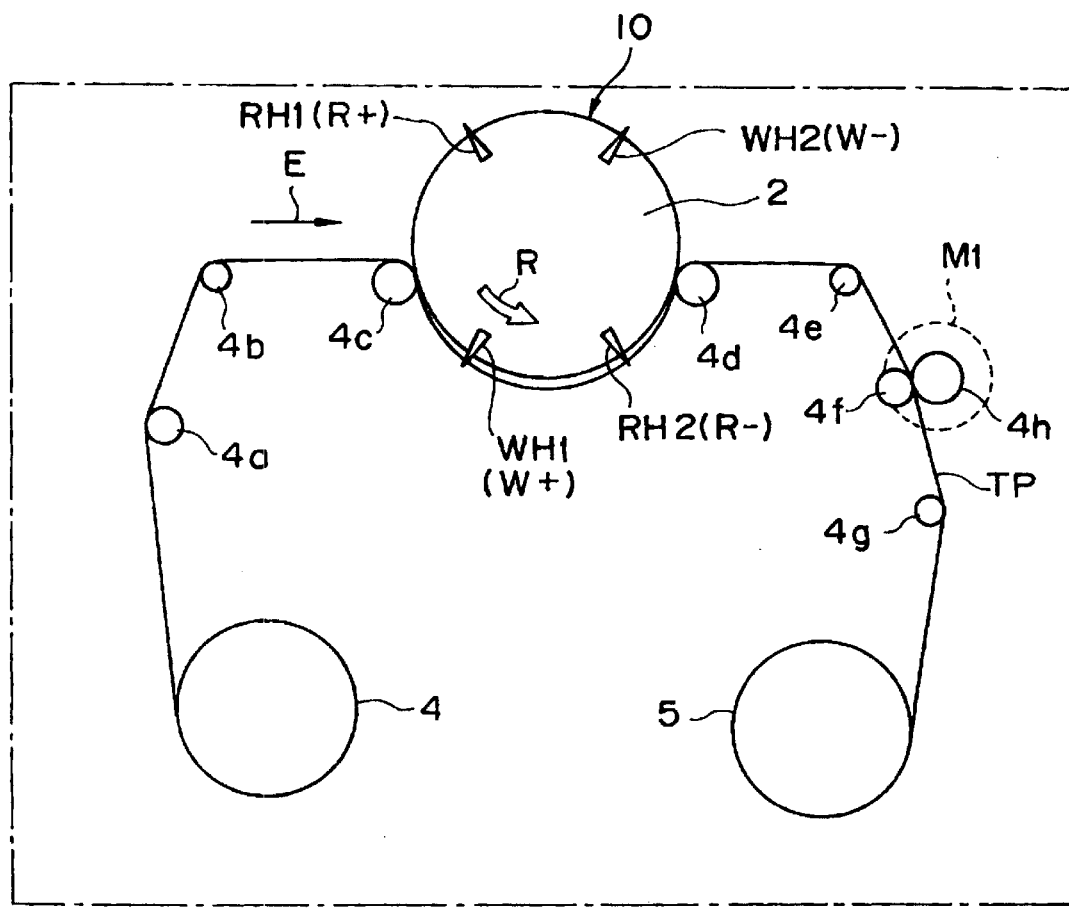
FIG. 2 is a plan view showing an example of an information writing apparatus including the rotary magnetic head apparatus of FIG. 1.

FIG. 1 shows a preferred embodiment of a rotary magnetic head apparatus of a tracking method comprising a non-contact-type transmission apparatus of the present invention. FIG. 2 shows an example of an information writing apparatus comprising a rotary magnetic head apparatus 10.

The rotary magnetic head apparatus 10 of FIGS. 1 and 2 is applicable to a video tape recorder, a data streamer, a digital audio system, and the like, and is used to record a signal onto recording tracks of a magnetic tape TP which is a tape-like recording medium by a tracking method and to reproduce information recorded on the magnetic tape TP.

The rotary magnetic head apparatus of FIGS. 1 and 2 includes a fixed drum 1, a rotary drum 2, and a motor M.

The rotary drum 2 has, for example, two reproduction heads RH1 and RH2, and two recording heads WH1 and WH2. Each of the reproduction heads RH1 and RH2 has a phase difference of 90 degrees, and each of the recording heads WH1 and WH2 has a phase difference of 90 degrees. The rotary drum 2 rotates in the direction of the arrow R with respect to the fixed drum 1 by the actuation of the motor M. The rotary drum 2, and the recording head WH and the reproduction head RH rotate in the R direction. The magnetic tape TP is fed obliquely along a tape feeding direction E from an entry side IN to an exit side OUT along a lead guide section 3 of the fixed drum 1.

In the information recording apparatus in FIG. 2, the magnetic tape TP is brought into close contact with almost 180 degrees of the rotary drum 2 and the fixed drum 1, after being through rollers 4a, 4b, and 4c from a supply reel 4, and can be taken up by a take-up reel 5 after being through the rollers 4d, 4e, 4f, and 4g. A capstan 4h is provided so that it corresponds to the roller 4f, and this capstan 4h is rotated by a capstan motor M1.

As a result, when the motor M is actuated and the rotary drum 2 is rotated in the R direction, the recording heads WH1 and WH2 and the reproduction heads RH1 and RH2 are brought into contact with the magnetic tape TP by a helical scan method and guided. The magnetic tape TP is fed obliquely along the lead guide section 3 of the fixed drum 1.

Figure 3:
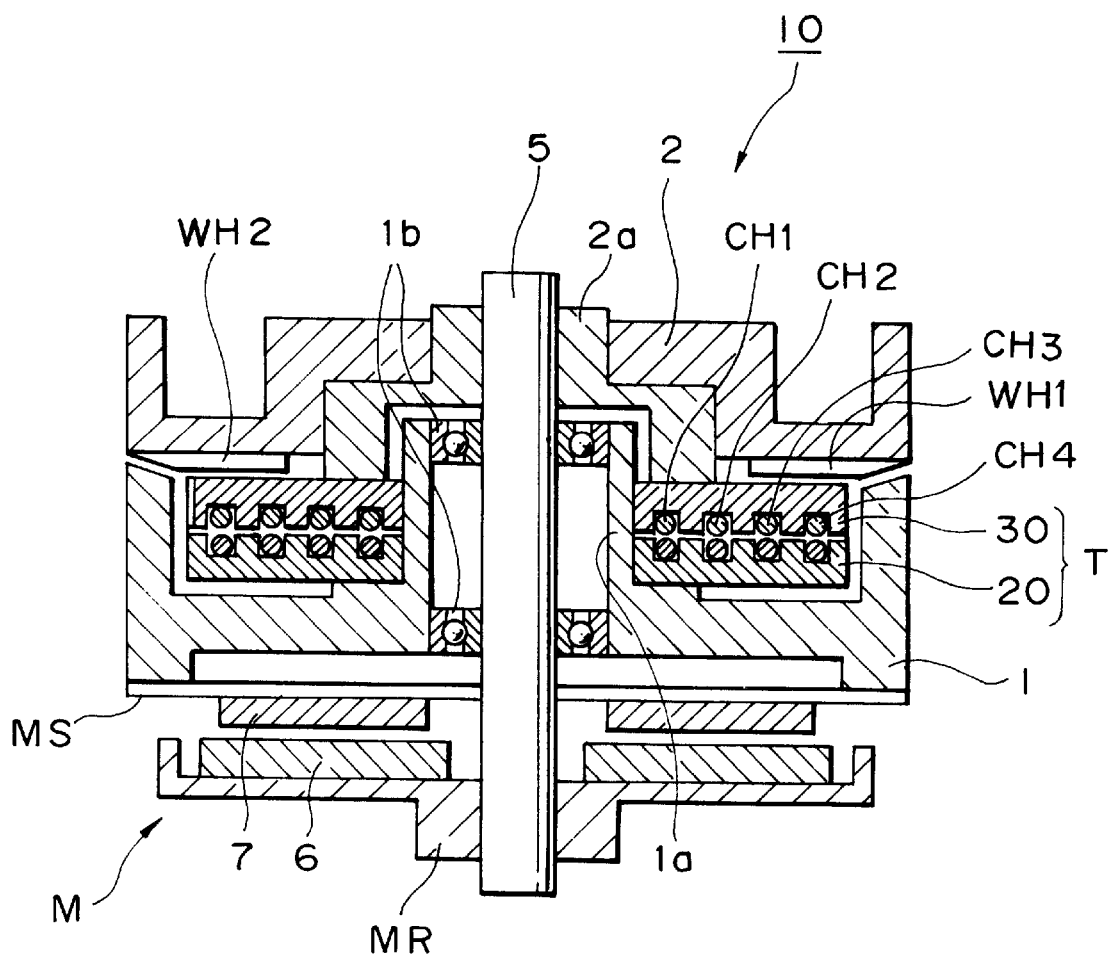
FIG. 3 shows an example of the construction of the rotary magnetic head apparatus of FIG. 1, in which an incorporated rotary transformer is of a plane-opposing type.
Figure 4:
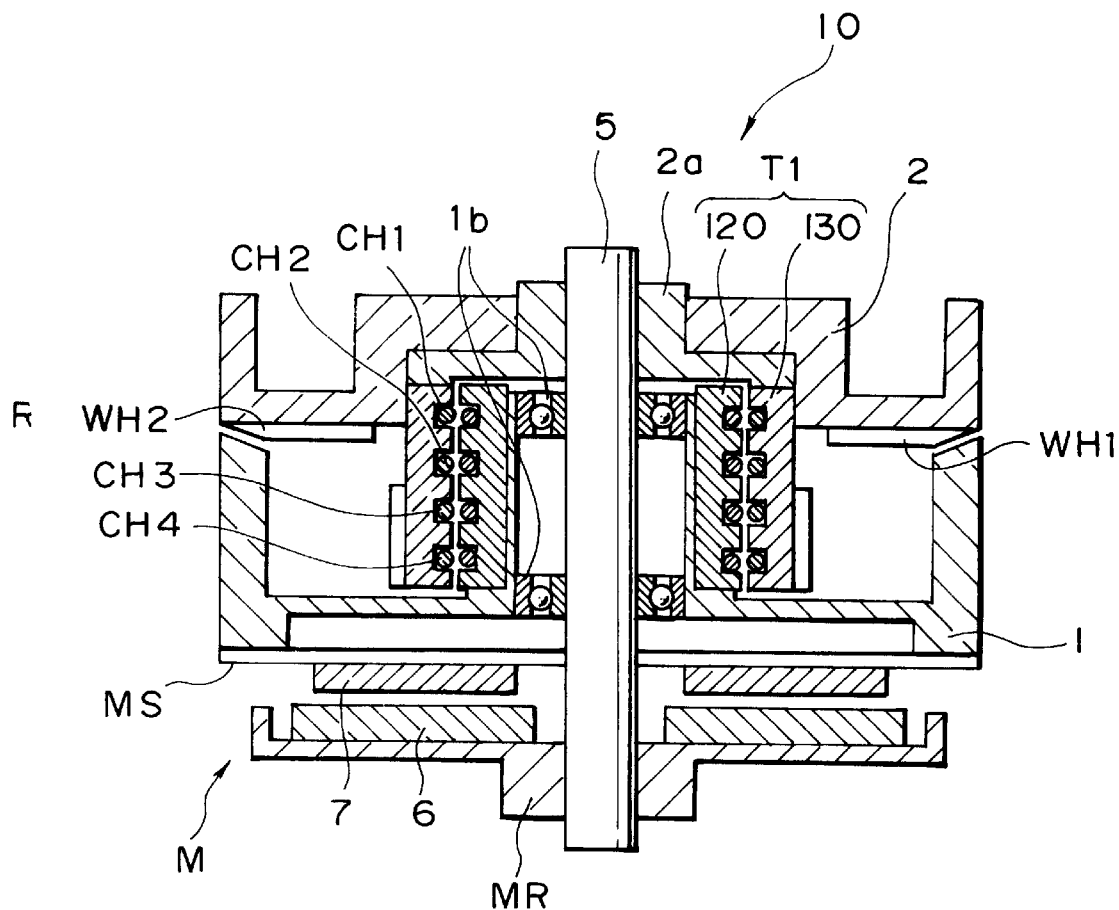
FIG. 4 shows another example of the construction of the rotary magnetic head apparatus of FIG. 1, in which an incorporated rotary transformer is of a cylindrical type.

An example of the construction of this rotary magnetic head apparatus 10 is shown in FIGS. 3 and 4.

The rotary magnetic head apparatus 10 of FIG. 3 comprises a rotary transformer T which is a non-contact-type transmission apparatus. This rotary transformer T is disposed between the rotary drum 2 and the fixed drum 1. That is, the rotary transformer T is incorporated within the rotary magnetic head apparatus 10.

The rotary magnetic head apparatus 10 is also called a rotary drum apparatus, and two bearings 1b are disposed within a sleeve 1a of the fixed drum 1. The fixed drum 1 has fixed thereto a stator core 20 which is a stator of the rotary transformer T.

The rotary drum 2 has a flange 2a, and this flange 2a is fixed to the upper end portion of the shaft 5 by press-fitting or bonding. The lower end portion of the shaft 5 is fixed to a rotor MR of the motor M. The motor M includes the rotor MR and a stator MS. The rotor MR is provided with, for example, a driving magnet 6, and the stator MS is provided with a driving coil 7. By supplying power to this coil 7 in a predetermined pattern, the rotor MR of the motor M is rotated continuously.

The intermediate portion of the shaft 5 is rotatably supported by bearings 1b and 1b. Inside the flange 2a, a rotor core 30, which is a rotor of the rotary transformer T, is fixed.

Figure 5:
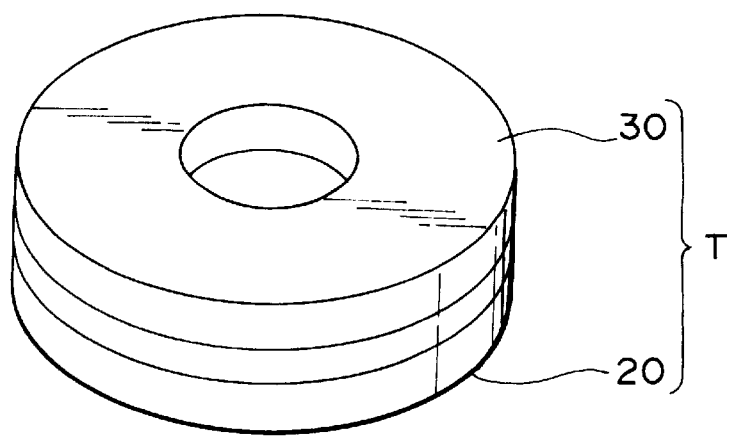
FIG. 5 is a perspective view showing the rotary transformer of FIG. 3.

The rotary transformer T of FIG. 3 is formed of a stator core 20 (stator) and a rotor core 30 (rotor), which are each a circular-plate-shaped core as shown in FIG. 5, and is made from a magnetic-permeable material, such as ferrite.

The stator core 20 and the rotor core 30 are formed in a ring form so that the sleeve 1a of FIG. 3 can be passed therethrough. Channels CH1 to CH4 for signal transmission are disposed in a ring form on the internal surface (the top surface in FIG. 3) of the stator core 20 and on the internal surface (the bottom surface in FIG. 3) of the rotor core 30 with the shaft 5 as the center, as will be described later.

The wiring section where these channels CH1 to CH4 may be formed by winding a conventional, insulated wire material in a ring form, or a printed-wiring board may be used.

As a result, when power is supplied to the coil 7 of the stator MS of the motor M, the rotor MR of the motor M, the shaft 5, the flange 2a, the rotary drum 2, and the rotor core 30 of the rotary transformer T rotate with respect to the fixed drum 1 and the stator core 20. The rotor core 30 and the stator core 20 are disposed in such a manner as to oppose each other in a non-contact manner.

Figure 6:
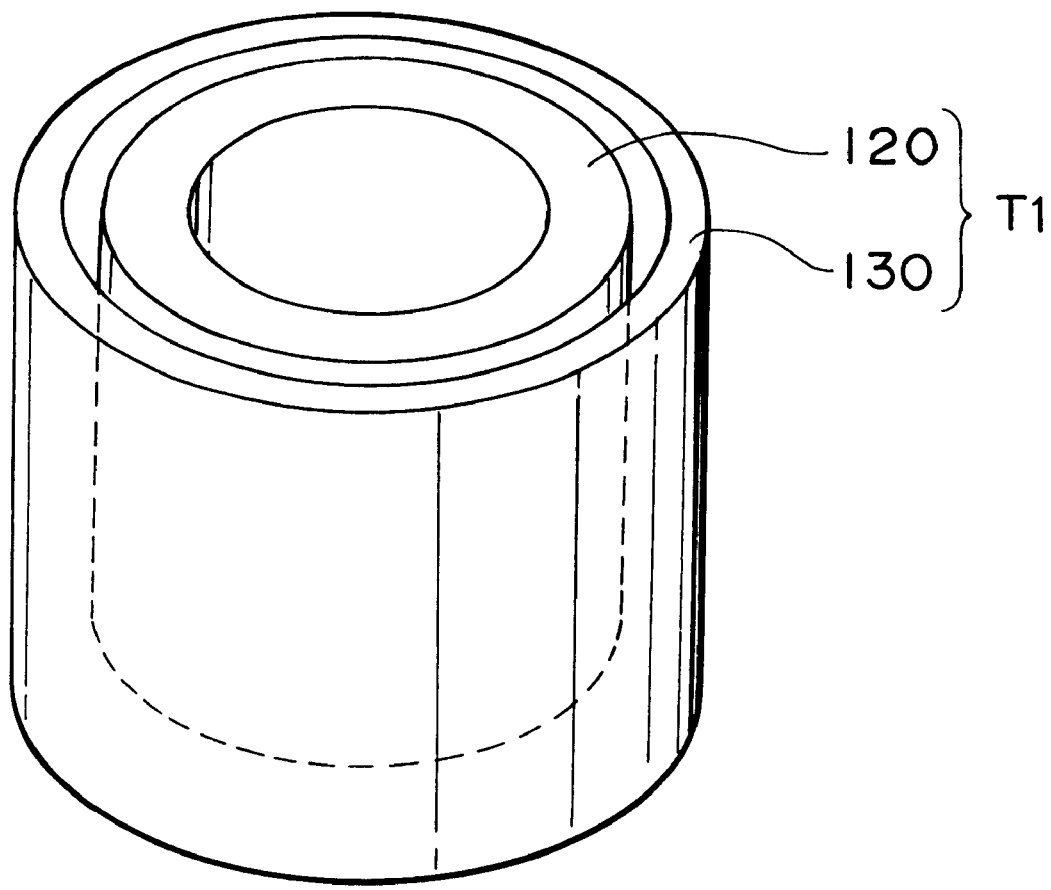
FIG. 6 is a perspective view showing the rotary transformer of FIG. 4.

Meanwhile, in the rotary magnetic head apparatus 10 of FIG. 4, a cylindrical stator core 120 such as that shown in FIG. 6 is fixed to the fixed drum 1. A rotor core 130 of a rotary transformer T1 is fixed to the flange 2a of the rotary drum 2. The stator core 120 and the rotor core 130 are disposed coaxially with the shaft 5 as the center, and the outside diameter of the stator core 120 is set to be smaller than the internal diameter of the rotor core 130. As a result, the outer surface of the stator core 120 and the inner surface of the rotor core 130 are placed in a non-contact manner with a predetermined gap. The channels CH1 to CH4 of the rotary magnetic head apparatus 10 of FIG. 4 are formed in a ring form in an axial direction.

When power is supplied in a predetermined power-supply pattern to the coil 7 of the stator MS of the motor M, the rotor MR of the motor M, the shaft 5, the flange 2a, and the rotor core 130 of the rotary transformer T1 rotate in a non-contact manner with a predetermined gap with respect to the fixed drum 1 and the stator core 120.

The non-contact-type transmission apparatus of the present invention can be applied to both the plane-opposing-type rotary transformer T such as that shown in FIG. 3 and the cylindrical-type rotary transformer T1 such as that shown in FIG. 4.

Next, referring to FIGS. 7 and 8, a description will be given of an example of the wiring construction of the rotary transformer T shown in FIGS. 3 and 5, and the surrounding arrangement of the rotary transformer T.

Figure 7:
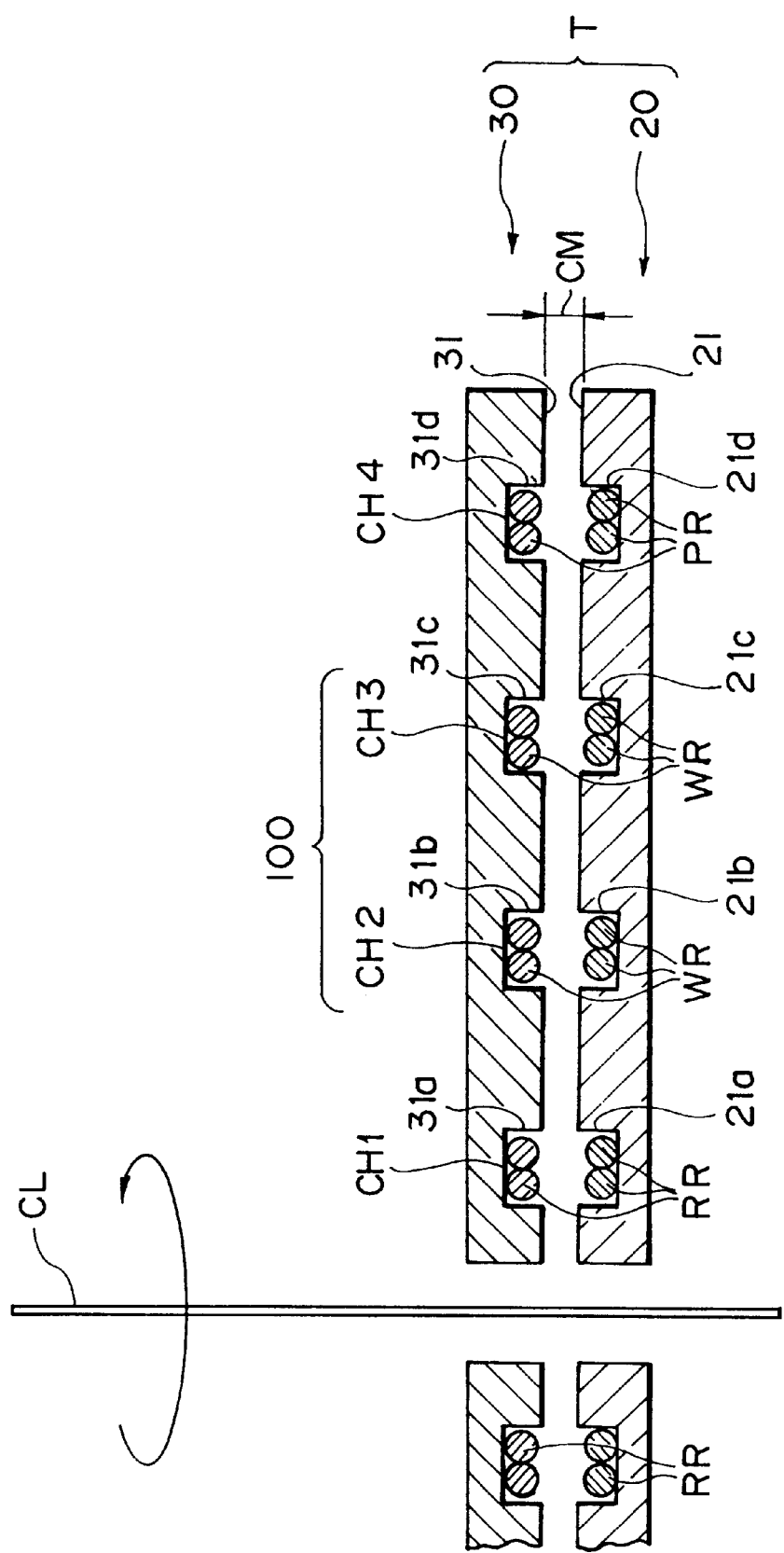
FIG. 7 is a partly omitted, sectional view showing an example of the construction of the rotary transformer of FIG. 5.

Since the right and left portions of the rotary transformer T shown in FIG. 7 are symmetrical, a part thereof is omitted, the stator core 20 and the rotor core 30 are disposed opposite to each other, and a predetermined gap CM is set.

The internal surface 21 of the stator core 20 is formed with, for example, four grooves 21a, 21b, 21c, and 21d coaxially with the center axis CL as the center from the inner peripheral side to the outer peripheral side. Similarly, an internal surface 31 of the rotor core 30 is formed with, for example, grooves 31a, 31b, 31c, and 31d coaxially with the center axis CL as the center. These grooves 21a to 21d and the grooves 31a to 31d are at opposing positions to each other.

Reproduction signal transmission rings RR are disposed in the grooves 21a and 31a, and recording signal transmission rings WR are disposed in the grooves 21b and 31b. Recording signal transmission rings WR are disposed in the grooves 21c and 31c, and power transmission rings PR are disposed in the grooves 21d and 31d.

The reproduction signal transmission rings RR, the recording signal transmission rings WR and WR, and the power transmission rings PR are each produced by winding, for example, an insulating, coated wire material into a ring form for a plurality of times. The rotor core 30 and the stator core 20 themselves are produced into a circular-plate form or a ring form in a magnetic-permeable material, such as ferrite. The reproduction signal transmission rings RR and the recording signal transmission rings WR are a signal transmission system, and the power transmission rings are a power-supply system.

Figure 8:
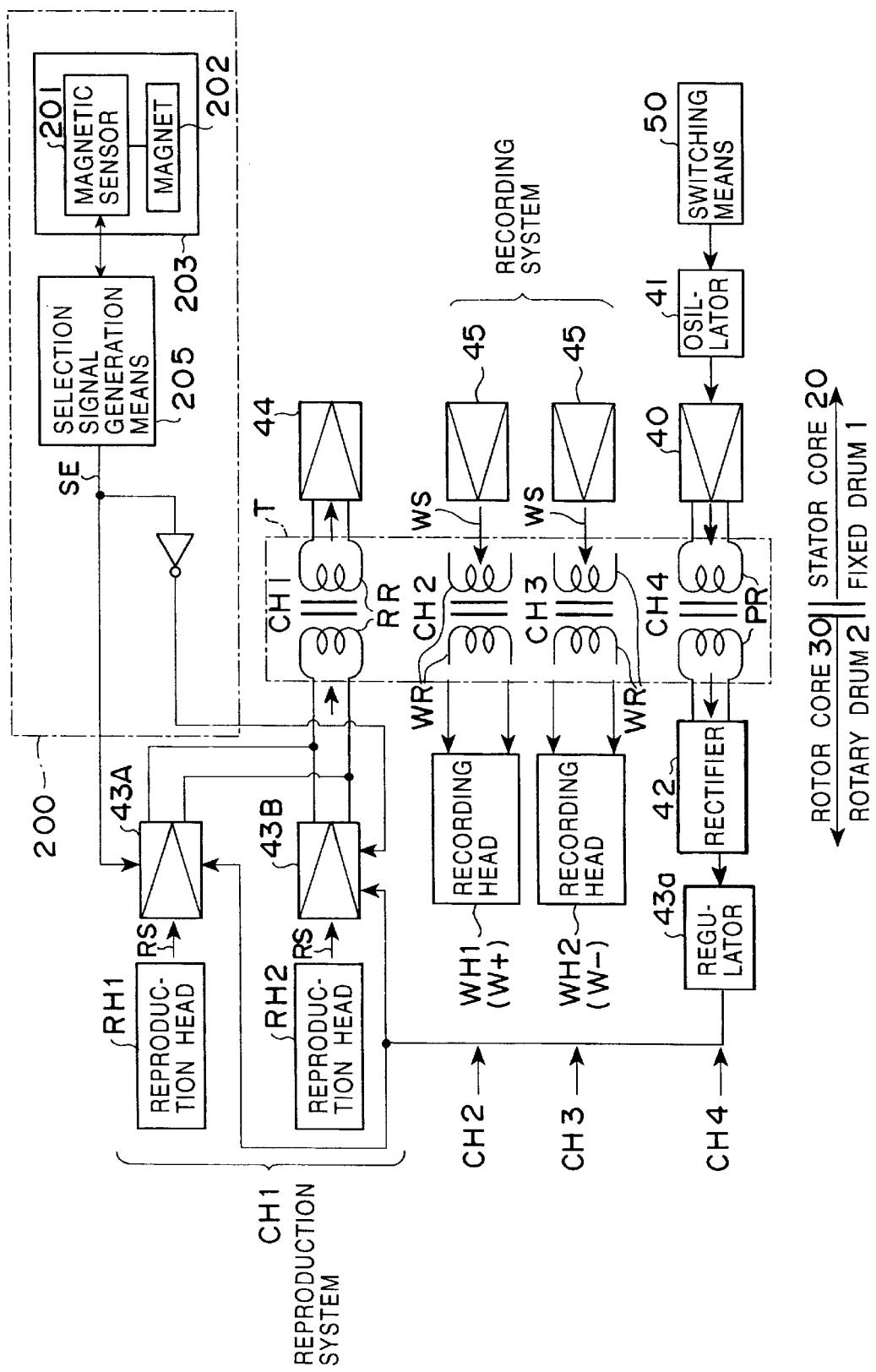
FIG. 8 shows the rotary transformer of FIG. 7, and the surrounding arrangement of the rotary transformer.

FIG. 8 shows the rotary transformer T, and the functional portions surrounding the rotary transformer T.

The rotary transformer T of FIG. 8 is shown differently to the rotary transformer T of FIG. 7, and the channels CH1 to CH4 are drawn in the vertical direction in FIG. 8.

As shown in FIGS. 8 and 7, the feature is that in the rotary transformer T, two areas, a power-supply area for the power transmission rings PR, a signal area for the reproduction signal transmission rings RR and the recording signal transmission rings WR are present separately. The area for the power transmission rings PR, and the reproduction signal transmission ring RR are separated by the area of the two recording signal transmission rings WR and WR.

These two recording signal transmission rings WR and WR serve as a crosstalk prevention section of the rotor core 30 and a crosstalk prevention section of the stator core 20 for preventing crosstalk in the area between the power transmission ring PR and the reproduction signal transmission ring RR.

In FIG. 8, the power transmission ring PR of the stator core 20 inside the power transmission ring PR of the channel CH4 is connected to an oscillator 41 via a power drive 40. The direct current with a high frequency generated by this oscillator 41 is converted into an alternating current, and the power drive 40 supplies the alternating current to the power transmission ring PR of the stator core 20. The power transmission ring PR of the stator core 20 transmits the alternating current to the power transmission ring PR of the rotor core 30 in a non-contact manner, the transmitted alternating current is rectified into direct current by a rectifier 42, and the direct current is set to a desired voltage by a regulator 43a.

The current set to the voltage from the regulator 43a is preferably supplied to the reproduction amplifiers 43A and 43B of the reproduction heads RH and used to amplify the reproduction current obtained by the reproduction heads RH1 and RH2. Also, the current of the regulator 43a can be supplied to reproduction signal selection means 200, which will be described later.

The reproduction heads RH1 and RH2 reproduce information of the magnetic tape TP of FIG. 1 and sends the reproduction signal RS to the reproduction amplifiers 43A and 43B, and the reproduction signal RS amplified by the reproduction amplifiers 43A and 43B is sent to the reproduction signal transmission ring RR of the rotor core 30 of the channel CH1. The amplified reproduction signal RS is sent from the reproduction signal transmission ring RR of the rotor core 30 without contact to the reproduction signal transmission ring RR of the stator core 20. On the stator core 20 side, the sent reproduction signal RS is further amplified by the reproduction amplifier 44.

A recording amplifier 45 on the fixed drum 1 side of FIG. 8 sends recording current from the recording signal source to the recording signal transmission rings WR and WR of the channels CH2 and CH3 of the stator core 20. When the recording signal WS is sent from the recording signal transmission ring WR of the stator core 20 to the recording signal transmission ring WR of the rotor core 30, this recording current is directly sent from the recording signal transmission ring WR of the rotor core 30 to the recording heads WH1 and WH2.

Since, as described above, the recording heads WHI and WH2 are directly connected to the recording signal transmission ring WR of the rotor core 30, it is possible to decrease the impedance in the low-frequency region in the recording signal system formed of the recording heads WH1 and WH2 in the low-frequency region and the recording signal transmission ring WR of the rotor core 30.

The recording signal transmission rings WR and WR disposed in the channels CH2 and CH3 are capable of preventing crosstalk between the reproduction system of channel CH1 and the power-transmission system of channel CH4. That is, the recording signal transmission rings WR and WR reduce crosstalk from the power-transmission system of the channel CH4 to the reproduction signal system of the channel CH1.

Switching means 50 of FIG. 8 is a switching means for turning on/off the actuation of the oscillator 41. This switching means 50 turns on or off the oscillation actuation for supplying power by turning on or off the oscillator 41. The reason why the oscillator 41 is turned on/off in this manner is as follows.

When the recording heads WH1 and WH2 are in contact with the magnetic tape TP (during signal recording), the switching means 50 turns off the oscillator 41, and when the recording heads WH1 and WH2 are not in contact with the magnetic tape TP (during signal reproduction), the switching means 50 turns on the oscillator 41.

When the recording heads WH1 and WH2 are in contact with the magnetic tape TP, that is, when the recording heads WH1 and WH2 are recording a signal onto the magnetic tape TP, the reproduction heads RH1 and RH2 are not reproducing a signal of the magnetic tape TP. Therefore, since there is no need to supply power to the reproduction amplifier 43 of FIG. 8 from the oscillator 41, the oscillator 41 is turned off. In comparison, when the recording heads WH1 and WH2 are not in contact with the magnetic tape TP, that is, when the reproduction heads RH1 and RH2 are reproducing a signal of the magnetic tape TP, the oscillator 41 is turned on and power is supplied from the regulator 43a to the reproduction amplifier 43, making it possible to amplify the reproduction signal RS of the reproduction heads RH1 and RH2.

Therefore, since in a state in which the recording heads WH1 and WH2 are in contact with the magnetic tape TP, the oscillator 41 is turned off, it is possible to reliably prevent crosstalk from the power system of the channel CH4 to the reproduction signal system of the channel CH1 in FIG. 8.

In the oscillator 41, in the case where direct current is converted into alternating current and the alternating current is converted again into direct current by the rectifier 42, a method of preventing crosstalk from the power system of the channel CH4 to the recording signal system (the reproduction signal system of the channel CH1) of the channels CH2 and CH3 can be adopted in such a way that the highest frequency band of the alternating current (AC) does not overlap with the frequency band of the recording signal of the channels CH2 and CH3.

Referring to 8, a description will be given of the reproduction heads RH1 and RH2 and the channel CH1 of the reproduction system in more detail.

The two reproduction heads RH1 and RH2 are connected to the reproduction amplifiers 43A and 43B, respectively. The reproduction heads RH1 and RH2 can transmit the reproduction signal RS from the tape-like information recording medium (magnetic tape TP) to the reproduction amplifier 43A or 43B. The output terminals of the reproduction amplifiers 43A and 43B are each electrically connected to one reproduction signal transmission ring RR of the rotor core 30. Also, the reproduction signal transmission ring RR of the stator core 20 is connected to the reproduction amplifier 44, and this reproduction amplifier 44 is connected to a signal processing section at a stage after an adjustment circuit.

Figure 9:
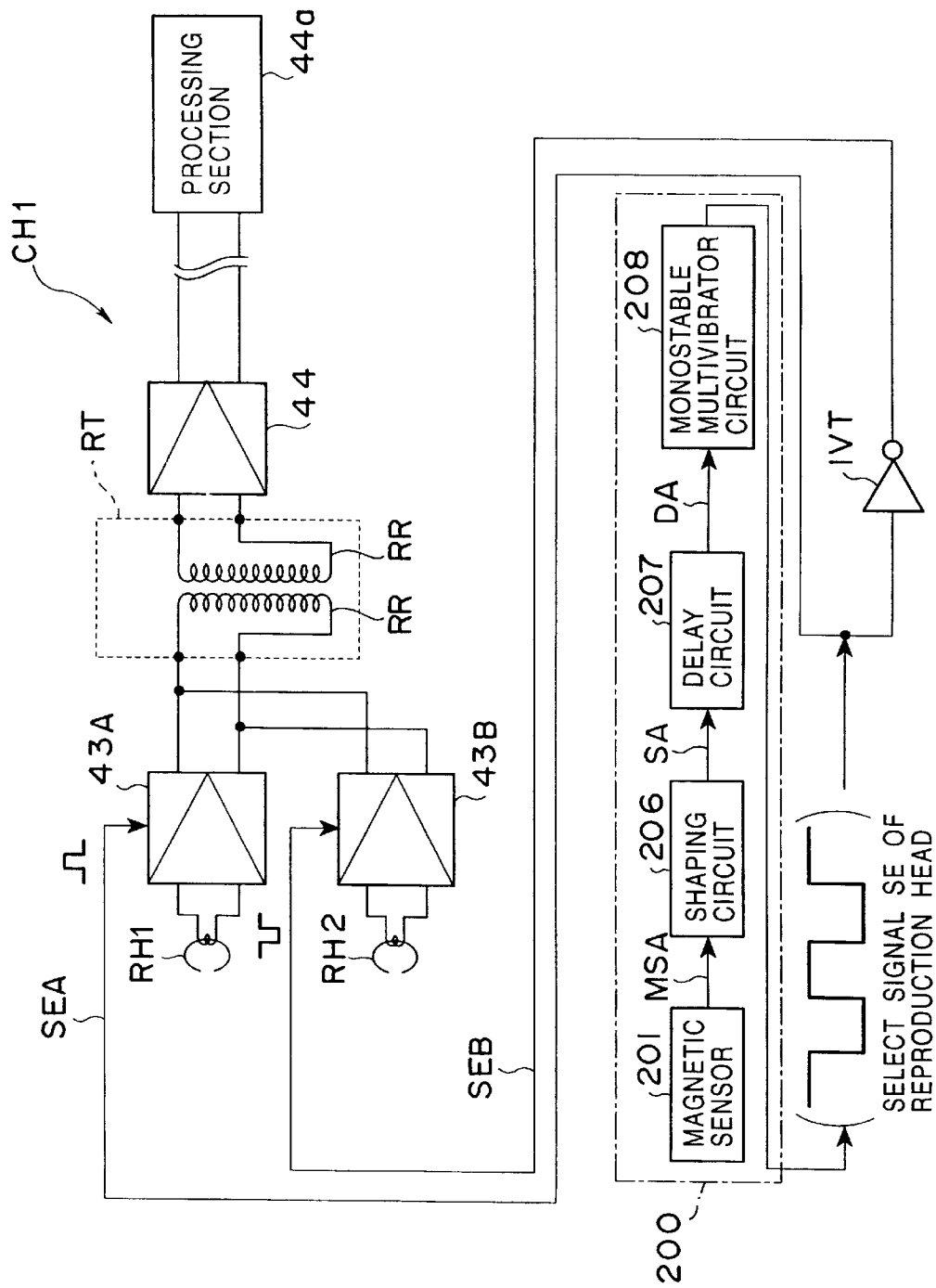
FIG. 9 shows selection signal generation means for generating a select signal SE of a reproduction head, a plurality of reproduction heads, and the like in the rotary magnetic head apparatus of the present invention.

As shown in FIGS. 8 and 9, in the reproduction signal selection means 200 for selecting reproduction signals RS and RS of each of the reproduction heads RH1 and RH2, the output section of a plurality of ICs (integrated circuits) of the reproduction amplifiers 43A and 43B having an output enable logic circuit incorporated therein is directly connected in parallel to the reproduction signal transmission ring RR (the rotor reproduction signal wiring section) of the rotor core 30 (on the rotor side) of the transmission apparatus.

The particular feature in FIG. 8 is that the reproduction signal selection means 200 is connected to the reproduction amplifiers 43A and 43B. This reproduction signal selection means 200 is a means for selecting the reproduction signals RS and RS of the tape-like information recording medium obtained by each of the reproduction heads RH1 and RH2 and arranging the reproduction signals in sequence.

This reproduction signal selection means 200 has the following elements. A magnetic sensor 201 and a magnet 202 form rotation detection means 203 for detecting the rotation of the rotary drum 2. The magnetic sensor 201 of this rotation detection means 203 is fixed to the rotary drum 2, as shown in FIG. 12, and the magnet 202 is fixed to the fixed drum 1. As a result of the magnetic sensor 201 rotating with respect to the fixed drum 1 together with the rotary drum 2 and detecting the magnetism of the magnet 202, a magnetic sensor output MSA shown in FIG. 11A can be output for each rotation. As shown in FIG. 13, the distance between the magnet 202 fixed to the fixed drum 1 and the center CL of the fixed drum 1 is indicated by a letter a. Also, as shown in FIG. 12, the angle between the magnetic sensor 201 of the rotary drum 2 and the reproduction head RH1 is indicated by θ. As shown in FIG. 13, while the rotary drum 2 is rotating at a fixed speed v, the relationship between a delay time d and an angle θ between the magnetic sensor 201 and the reproduction head RH1 is as follows:

$d = (2\pi a \times \theta / 360°)/v.$

Figures 11A, 11B, 11C, 11D:
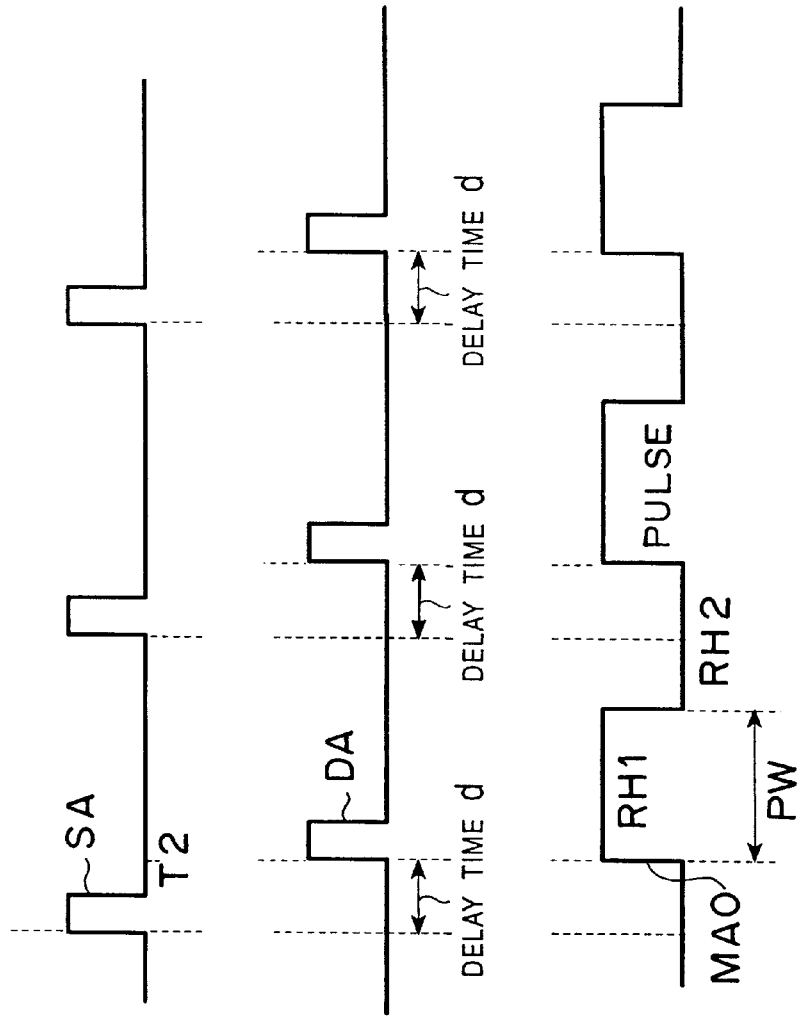
FIGS. 11A, 11B, 11C and 11D show examples of an output from a magnetic sensor, an output after waveform is shaped, an output from a delay circuit, and an output from a monostable multivibrator circuit.
Figure 12:
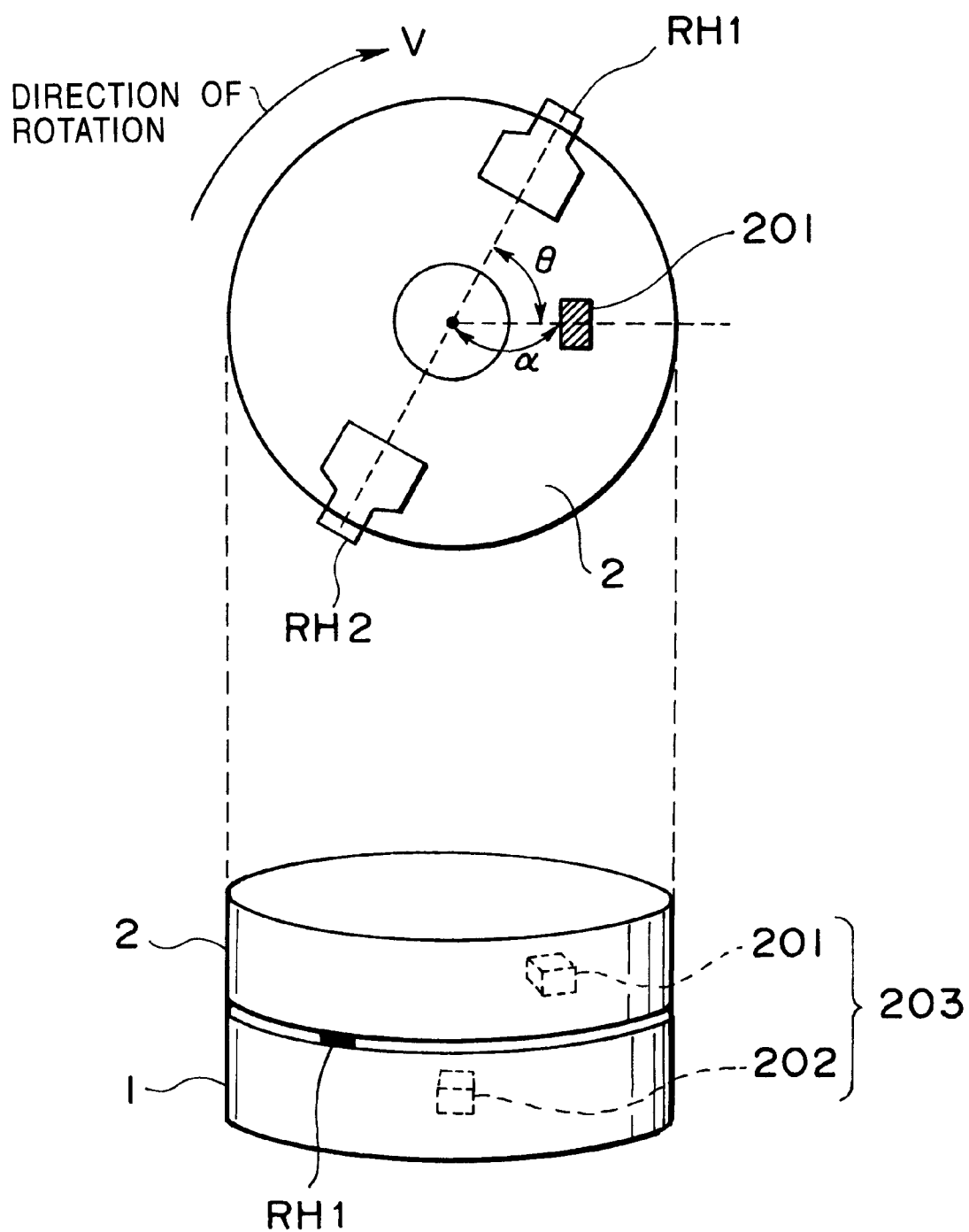
FIG. 12 shows examples of a magnetic sensor provided in a rotary drum and a magnet provided in a fixed drum.

This delay time d is a time for making a delay from the rise time T1 of the magnetic sensor output MSA, as shown in FIG. 11C.

Referring back to FIG. 8, the magnetic sensor 201 of the reproduction signal selection means 200 is connected to selection signal generation means 205, as shown in FIGS. 8 and 9. This selection signal generation means 205 includes a shaping circuit 206, a delay circuit 207, and a monostable multivibrator circuit 208.

Referring to FIGS. 9 and 11, the magnetic sensor output MSA that the magnetic sensor 201 detects the magnetism of the magnet 202 of FIG. 12 and outputs is input to the shaping circuit 206 of the selection signal generation means 205, and an output SA after the waveform, shown in FIG. 11B, is shaped is output.

The delay circuit 207 of FIG. 9 outputs an output DA after the delay circuit, shown in FIG. 11C, at a time T2 delayed by a delay time d from the time T1.

The monostable multivibrator circuit 208 outputs an output MAO after the monostable multivibrator circuit, shown in FIG. 11D, in accordance with this output DA after the delay circuit. This output MAO after the monostable multivibrator circuit is a rectangular waveform having a predetermined pulse width PW, and an output MAO (+) after the monostable multivibrator circuit is a select signal SE of the reproduction head shown in FIG. 9 for selecting the reproduction heads RH1 and RH2. This select signal SE of the reproduction head is directly input as a select signal SEA to the reproduction amplifier 43A of the reproduction head RH1, as shown in FIGS. 8 and 9, and the select signal SE of the reproduction head is also input as a select signal SEB to the reproduction amplifier 43B of the reproduction head RH2 via an inverter IVT.

Figure 10:
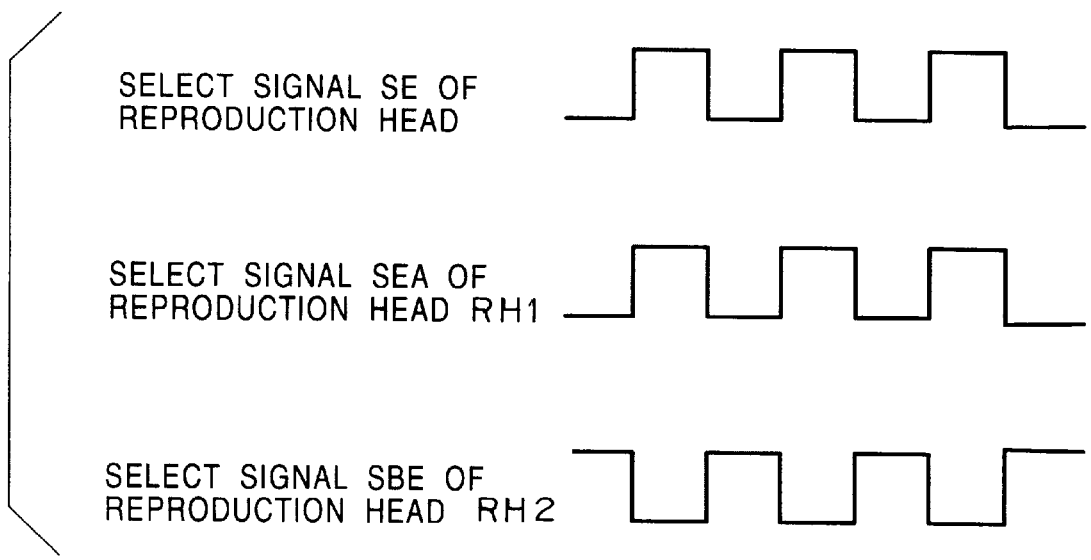
FIG. 10 shows examples of the waveform of the select signal SE, and select signals SEA and SEB of the reproduction head in FIG. 9.

As shown in FIG. 10, this select signal SEA is a pulse synchronized with the select signal SE of the reproduction head, whereas the select signal SEB is a signal inverted with respect to the select signal SE of the reproduction head.

Figure 14A:
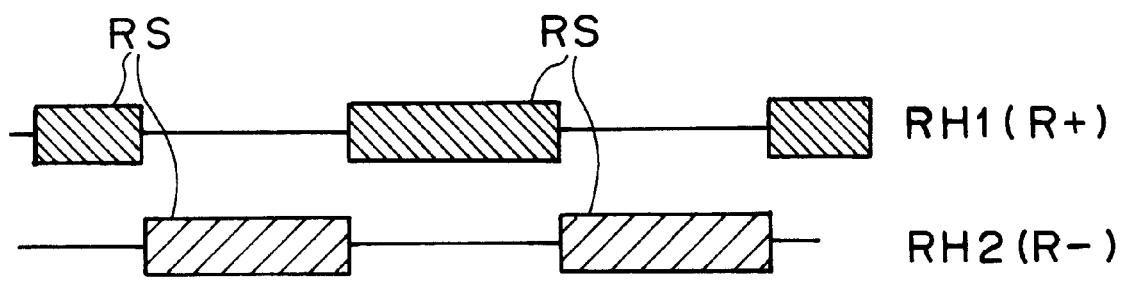
FIGS. 14A and 14B show an example in which reproduction signals obtained by a plurality of reproduction heads are synthesized for one channel.
Figure 14B:
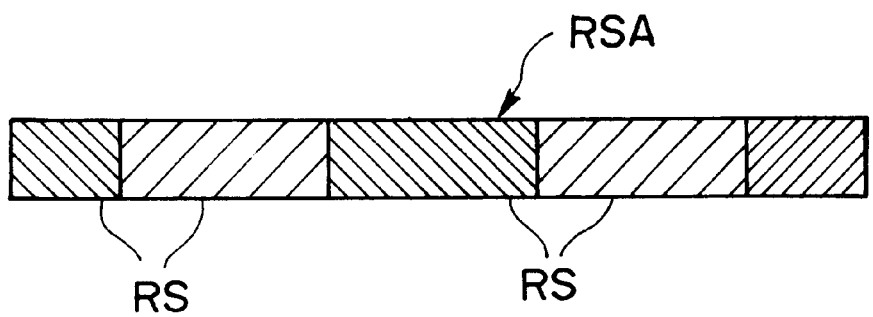

As a result, the reproduction signals RS of the reproduction heads RH1 and RH2 are supplied to the reproduction signal transmission ring RR which is a rotor reproduction signal wiring section shown in FIGS. 8 and 9 in such a way that the reproduction signals are arranged alternately in sequence in the manner shown in FIGS. 14A and 14B. From the reproduction signal transmission ring RR of the rotor core 30 which is a rotor reproduction signal wiring section, the reproduction signals of the two reproduction heads RH1 and RH2 can be sent without contact to the reproduction signal transmission ring RR of the stator core 20 which is a stator reproduction signal wiring section in such a way that the reproduction signals are arranged in sequence. That is, even if there are two reproduction heads RH1 and RH2, if there is one channel CH1 of the reproduction system, it is possible to send the reproduction signal RS to the reproduction amplifier 44.

FIGS. 14A and 14B show an example in which the reproduction signals RS obtained by the two reproduction heads RH1 and RH2 in this way are arranged into one channel.

In FIGS. 2 and 8, the reproduction head RH1 (R+) and the reproduction head RH2 (R−) show that the magnetic gaps thereof have a +azimuth angle and a −azimuth angle, respectively. Also, the recording head WH1 (W+) and the recording head WH2 (W−) show that the magnetic gaps thereof have a +azimuth angle and a −azimuth angle, respectively.

Next, another embodiment of the present invention will be described briefly with reference to FIG. 15.

Figure 15:
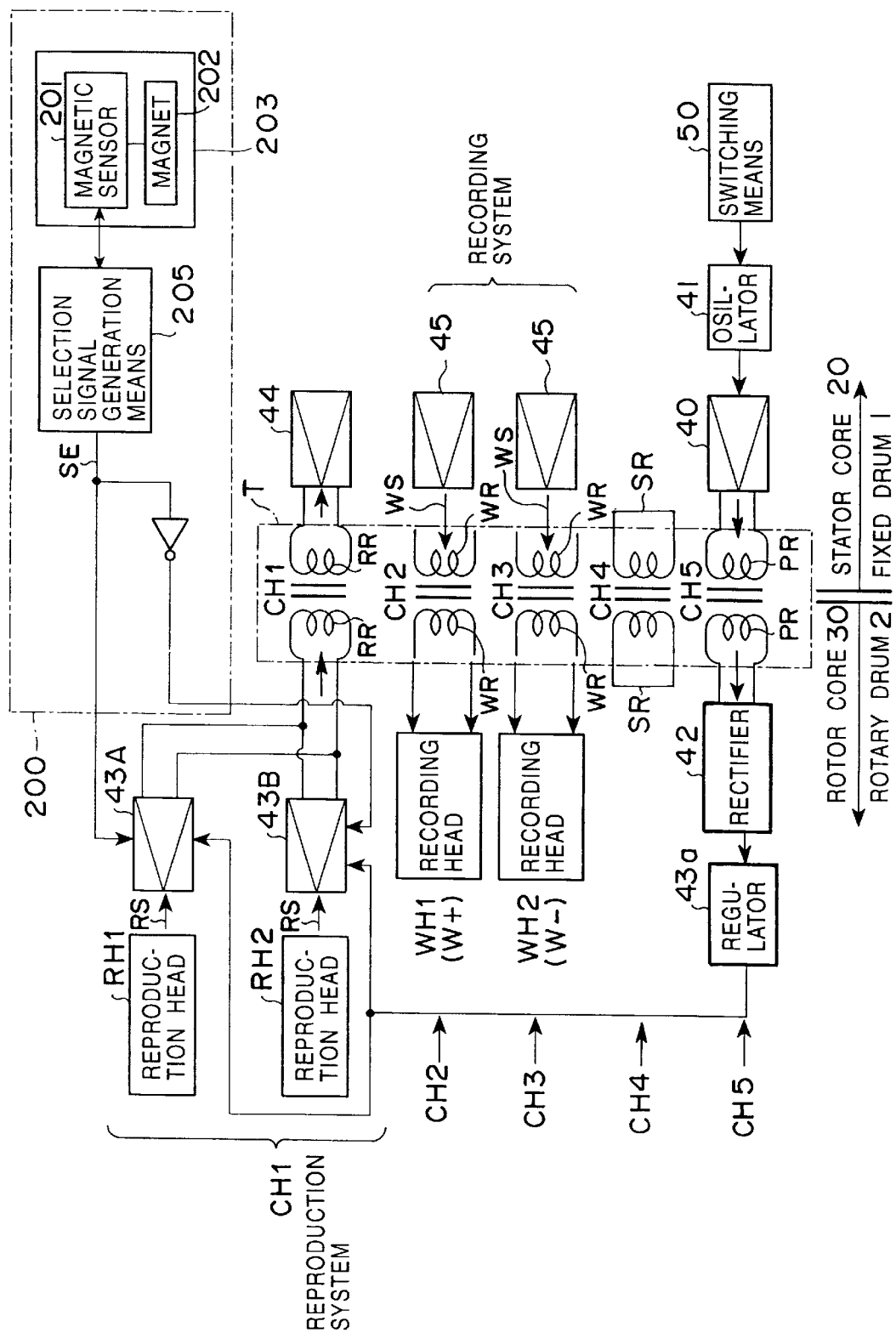
FIG. 15 shows another embodiment of the rotary magnetic head apparatus of the present invention.

Since the embodiment of FIG. 15 is substantially the same as the embodiment of FIG. 8, components in FIG. 15 which are the same as those in FIG. 8 are given the same reference numerals, and a description thereof has been omitted.

The difference of the embodiment of FIG. 15 from the embodiment of FIG. 8 is that short rings SR and SR which are crosstalk prevention sections are actively disposed between the two recording heads WH1 and WH2 (the recording channels CH2 and CH3), and the power transmission channel CH5. That is, the short ring SR is disposed in the rotor core 30, and the short ring SR is also disposed in the stator core 20.

The short rings SR and SR disposed in this channel CH4 are each a short-circuit-type ring, which can prevent crosstalk between the reproduction system of the reproduction channel CH1 of the channel CH1, and the power transmission system of the recording heads WH1 and WH2 and the channel CH4. As is well known, these short rings SR and SR can cancel a leakage magnetic-field between the adjacent power transmission channel CH5 and the reproduction channel CH1 or the recording channels CH2 and CH3, and suppress leakage of a signal (commonly called crosstalk) from the power transmission channel CH5 with a large power to the reproduction channel CH1 and the channels CH2 and CH3 with a small power.

Although the above embodiments of the present invention describe a plane-opposing-type rotary transformer T shown in FIG. 2, in addition to this, the above-described embodiments are applicable to the cylindrical-type rotary transformer T1 shown in FIGS. 4 and 6.

In the rotary transformer which is a non-contact-type transmission apparatus of the embodiment of the present invention, since both a signal area and a power area are provided, and a crosstalk prevention section is provided between them, it is possible to transmit both signals and power reliably without contact. As a result, a first-stage reproduction amplifier may be provided in the drum of the rotary magnetic head apparatus so as to prevent deterioration of the S/N ratio.

In the embodiments shown in the figures, since the construction is formed such that power is supplied from the power system to the reproduction amplifier 43 of the reproduction system, as the reproduction head RH, for example, a magneto-resistive element head (MR) may be used. The magneto-resistive element head (MR) for reproduction always requires a bias current when a reproduction signal is to be obtained, and by sending a bias from the regulator 43a to the reproduction amplifier 43, the magneto-resistive element head can be operated to obtain the reproduction signal. This magneto-resistive element head is a head for causing variation the resistance when the magnetic field is varied. The magneto-resistive element head converts variation in the signal magnetic-field (input signal) into resistance variation and pick it up as a variation in the reproduction output signal (voltage).

This magneto-resistive element head is capable of obtaining a highly stable reproduction output signal without depending upon the speed of the magnetic tape TP.

In the embodiments of the present invention, the design is formed such that the times in which the plurality of reproduction heads RH1 and RH2 contact a tape-like information recording medium do not overlap with each other, and an amplifier for reproduction is connected to each of the reproduction heads RH1 and RH2. After the reproduction signal RS is amplified by this amplifier, the reproduction signal is arranged in sequence as the reproduction signal RSA arranged as shown in FIG. 14B by the reproduction signal selection means 200 functioning as a switching circuit and formed into the reproduction signal of one channel. After being formed into the reproduction signal of one channel, the reproduction signal of one channel is sent to the signal processing section side without contact via the rotary transformer.

That is, since the contact of the plurality of reproduction heads RH1 and RH2 with the tape-like information recording medium is independent in relation to time, the reproduction signal RS can be formed into one channel by switching the reproduction signal RS after being amplified.

As described in FIGS. 11A and 11B to 13, the magnetic sensor 201 at a position of an angle θ from one reproduction head RH1 causes the output SA after the waveform is shaped to be delayed by a delay time d, which can be computed on the basis of the positional relationship of the magnetic sensor 201, as shown in FIG. 11B by the delay circuit 207 shown in FIG. 9, and the output DA after the delay circuit is obtained. The select signal SE of the reproduction head, which is an output after the monostable multivibrator circuit, shown in FIG. 11D, is output in synchronization with this output DA after the delay circuit. By appropriately adjusting the duty of the high portion corresponding to the reproduction head RH1 of the select signal SE of this reproduction head to the low portion corresponding to reproduction head RH2, optimization is possible by causing select signals SE of the two reproduction heads RH1 and RH2 to have the same width.

As described above, the reproduction signal selection means 200 shown in FIGS. 8 and 9 is designed to output a select signal having an output of commonly called exclusive OR.

When the plurality of recording heads of FIG. 8 do not require a RSW (Read after Write) mode, the recording heads are designed to interpose a plurality of recording channels between the power channel and the reproduction channels by using the fact that the times in which each recording head contacts the tape are independent in relation to time. This RSW mode is a mode in which after information is recorded, the recorded information is immediately reproduced and confirmed. The reproduction signal selection means 200 such as that shown in FIG. 8 can be realized with a relatively simple circuit.

Although the embodiments of the present invention describe an example in which two reproduction heads are used, in addition to this example, it is a matter of course that the present invention is applicable to a case in which three or more reproduction heads are provided. Also, although two recording heads are shown in the figures, in addition to this example, it is a matter of course that the present invention is applicable to a case in which three or more recording heads, or only one recording head is used.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A rotary magnetic head apparatus which records a signal onto a tape-like information recording medium and reproduces a signal of a tape-like information recording medium, said rotary magnetic head apparatus comprising:

a transmission apparatus for transmitting power and signals in a non-contact manner between a rotor and a stator;

a rotary drum having the rotor of the transmission apparatus, a recording head and a number of reproduction heads;

a fixed drum of the rotary magnetic head apparatus having the stator of the transmission apparatus;

reproduction signal selection means for selecting a reproduction signal of the information recording medium, which reproduction signal is obtained by each reproduction head and for arranging the reproduction signal in sequence;

a rotor reproduction signal wiring section which is disposed in the rotor and to which is input a reproduction signal of each reproduction head, which reproduction signal is sent, from the reproduction signal selection means;

a rotor power-supply wiring section disposed in the rotor;

a number of rotor recording signal wiring sections each only disposed between the rotor reproduction signal wiring section and the rotor power-supply wiring section;

a stator reproduction signal wiring section, which is disposed in the stator, for receiving a reproduction signal in a non-contact manner from the rotor reproduction signal wiring section;

a stator power-supply wiring section disposed in the stator; and a number of stator recording signal wiring sections each only disposed between the stator reproduction signal wiring section and the stator power-supply wiring section, wherein power is supplied from the stator power supply wiring section through the rotor power supply wiring section to the number of reproducing heads during a reproduction operation and power is not supplied from the stator power supply wiring section through the rotor power supply wiring section the number of reproducing heads during a recording operation when the recording head is recording a signal.

2. A rotary magnetic head apparatus according to claim 1, wherein the reproduction signal selection means comprises:

rotation detection means for detecting a rotation of the rotary drum; and selection signal generation means for generating a selection signal for selecting a reproduction signal of each reproduction head in accordance with a detection signal generated by the rotation detection means.

3. A rotary magnetic head apparatus according to claim 2, wherein the rotation detection means comprises:

a magnet mounted to the rotary drum; and a magnetic sensor, which is provided in the rotary drum, for detecting the magnetism of the magnet.

4. A rotary magnetic head apparatus according to claim 1, wherein the rotary drum includes a plurality of recording heads.

5. A rotary magnetic head apparatus according to claim 4, wherein the times that each recording head contacts the tape-like information recording medium do not overlap each other.

6. A rotary magnetic head apparatus according to claim 1, wherein in the reproduction signal selection means for selecting a reproduction signal of each reproduction head, a plurality of output sections of a reproduction amplifier having incorporated therein an output enable logic circuit are connected directly in parallel to the rotor reproduction signal wiring section on the rotor side of the transmission apparatus.

* * * * *